June 13, 1967   A. C. STUMPE   3,325,720

INVERTER

Filed Nov. 6, 1964

Inventor:
August Christian Stumpe
By: Spencer & Kaye
ATTORNEYS

United States Patent Office 3,325,720
Patented June 13, 1967

3,325,720
INVERTER
August Christian Stumpe, Frankfurt am Main, Germany, assignor to Licentia Patentverwaltungs G.m.b.H., Frankfurt am Main, Germany
Filed Nov. 6, 1964, Ser. No. 409,397
Claims priority, application Germany, Nov. 9, 1963, L 46,285
9 Claims. (Cl. 321—45)

The present invention relates to an inverter, i.e., an inverted converter for producing an alternating current output, especially for changing direct current into alternating current.

More particularly, the present invention resides in an inverter which functions as a high-power source for producing an alternating current output capable of operating at frequencies higher than 10 kilocycles. Inverters of this type incorporate so-called controllable rectifiers, i.e., rectifiers, often of the solid-state type, which can be turned on and off so as to be able to occupy conductive and non-conductive states. Certain types of inverters incorporate resonant circuits which are pulsed periodically by means of the controllable rectifiers, inverters of this type having been found suitable for use as high-frequency power sources. The maximum frequency which can be obtained, however, is inherently limited by the recovery time and by the ratio of the minimum duration during which the negative or reverse-bias voltage appears across the controllable rectifier immediately after the same has conducted current to the duration of a complete period or cycle. This ratio is dependent on the particular circuit. One such circuit which is particularly advantageous insofar as this consideration is concerned, involves a transformer having a center-tapped primary winding, whose outer terminals are connected, via respective controllable rectifiers, to a source of direct current, the center tap being connected, via a capacitor, with one terminal of the direct current source.

In many cases, however, it is not practical to provide either center-tapped batteries or center-tapped transformers. One reason for this is that the cost for such center-tapped batteries and transformers is relatively high and, as experience has shown, such center-tapped circuits are at times susceptible to breakdowns.

It is, therefore, the primary object of the present invention to provide a high frequency inverter which possesses the advantageous operating characteristics of the above-mentioned circuit arrangement incorporating center-tapped batteries, voltage sources, transformers and/or inductances, but which avoids the use of such center-tapped components.

With the above objects in view, the present invention resides, basically, in a high frequency inverter incorporating controllable rectifiers, in which there is provided a series-circuit consisting of two capacitors and an inductance therebetween, this series-circuit being connected to the direct current source via an inductance. Furthermore, there are two controllable rectifiers, one of which is connected across one of the capacitors of the series-circuit and the inductance which lies between the two capacitors, while the other rectifier is connected across the other capacitor and the central inductance.

Additional objects and advantages of the present invention will become apparent upon consideration of the following description when taken in conjunction with the accompanying drawings in which.

Figure 1:
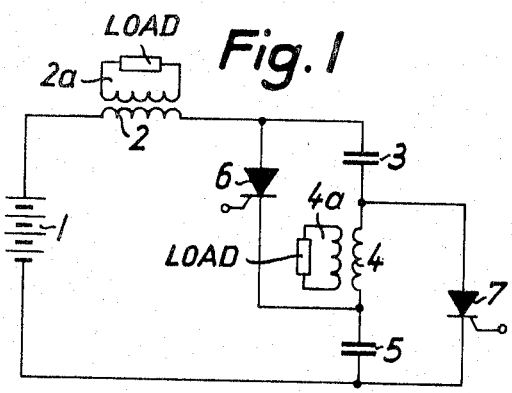
FIGURE 1 is a circuit diagram of one embodiment of the present invention.

Referring now to the drawings and to FIGURE 1 thereof in particular, the same shows a direct current source 1 which has connected in series with it an inductance 2 and a series-circuit incorporating a first capacitor 3, an inductance 4, and a second capacitor 5, so that the inductance 4 can be considered as lying between the two capacitors 3 and 5. A first controllable rectifier 6 is connected so as to be in parallel with so much of the series-circuit 3, 4, 5, as includes the capacitor 3 and the inductance 4, while a second controllable rectifier 7 is connected across so much of the series-circuit 3, 4, 5, as includes the inductance 4 and the second capacitor 5.

When the circuit is connected across the voltage source 1, the two capacitors 3 and 5 will be charged up. If the controllable rectifier 6 is now turned on by a gate-pulse from a well-known pulse-generator, i.e., rendered conductive, the capacitor 5 will form, together with the inductance 2, a resonant circuit which, as a result of the turning on of the rectifier 6, is caused to undergo half an oscillation. In the course of this half oscillation, the capacitor 5 will be charged to a voltage which, depending on the damping of the resonant circuit, will be more or less above that of the voltage of the voltage source 1. The turning on of the rectifier 6 will, at the same time, connect the capacitor 3 and the inductance 4 to form a resonant circuit which is caused to undergo half an oscillation so that the charge of the capacitor 3 is changed via the inductance 4. After the end of the half oscillation of the two resonant circuits which were formed by turning on of the rectifier 6, the anode current attempts to flow in reverse direction through the rectifier 6 which, therefore, is turned off, i.e., rendered non-conductive. After a waiting period which is determined by the so-called turn-off time of the rectifier 6, it will be the rectifier 7 which is turned on. The turning on of the rectifier 7 causes the inductance 2 to form a resonant circuit with the capacitor 3, this resonant circuit being connected across the voltage source 1. This connection of the resonant circuit causes the same to undergo half an oscillation, so that the capacitor 3 is charged to a voltage above that of the voltage source 1. The turning on of the rectifier 7 also causes the inductance 4 and the capacitor 5 to be connected to form a resonant circuit which is triggered to undergo half an oscillation. In the course of this half oscillation, the charge of the capacitor 5 is changed via the inductance 4. After the end of this half oscillation of both resonant circuits, the rectifier 6 can once again be turned on, after the elapse of a suitable time interval corresponding to that of the turn-off time of the rectifier 7.

In this way, the capacitors 3 and 5 are alternately charged up via the inductance 2 and have their charge changed via the inductance 4, so that these inductances 2 and 4 may be considered as constituting so-called charging and charge-change inductances, respectively.

The inductance 2 as well as the inductance 4 can, in this circuit, be utilized as a load inductance. Furthermore, alternating voltages can be taken off across the two inductances 2 and 4, which, during the current supplying time of the two rectifiers 6 and 7, have the wave shape of a cosinusoidal half oscillation. The connection of load means to the inductances 2, 4, is represented by the load circuits 2a, 4a, respectively.

Figure 2:
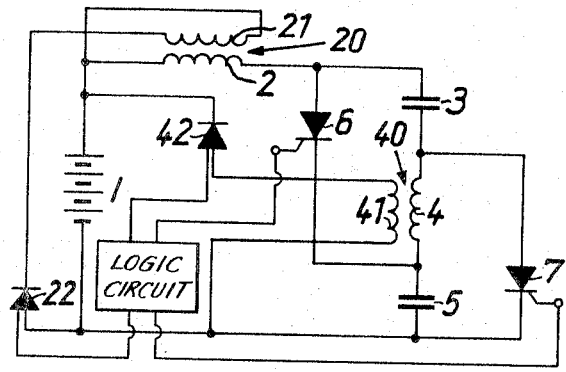
FIGURE 2 is a circuit diagram of another embodiment of the present invention.

In the circuit of FIGURE 2, each of the inductances 2 and 4 is constituted by the primary winding of a respective transformer 20, 40, each transformer having a respective secondary winding 21, 41. Each of the secondary windings 21, 41 is connected, via a respective rectifier 22, 42, across the voltage source 1. In this way, the voltage across the windings will be limited, in a direction depending on the polarity of the respective rectifiers 22, 42, so that even if the load changes, the voltages can not build up to excessive high values.

The circuit of FIGURE 2 operates particularly advantageously if the rectifiers 6 and 7 are controlled in dependence upon the current flow through the rectifiers 22 and 42 such that the rectifiers 6 and 7 are rendered conductive if current has passed through the respective rectifiers 22, 42 before. This can be accomplished by auxiliary means, as for example logic circuits. As a result, if the inverter is overloaded, it will turn itself off, so that there is then obtained an automatic overload protection.

Figure 3:
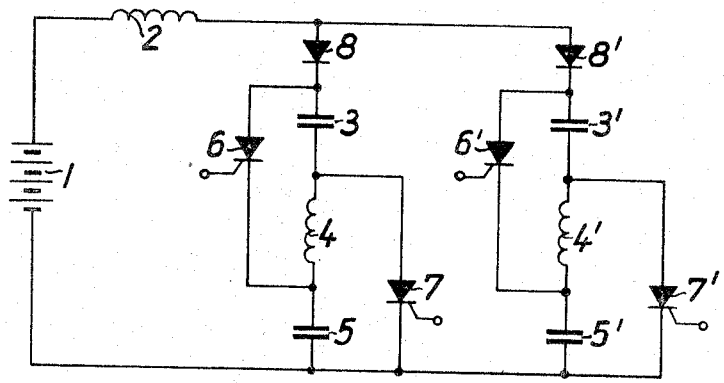
FIGURE 3 is a circuit diagram of yet another embodiment of the present invention.

The circuit of FIGURE 3 makes it possible to obtain an output frequency which is equal to or even somewhat greater than the reciprocal of the recovery time of a controllable rectifier. This is accomplished by providing two or more series-circuits, each of which incorporates a first capacitor, an inductance, and a second capacitor, each of which series-circuits is connected, via the inductance 2, to the voltage source 1. Such a circuit arrangement is shown in FIGURE 3, which illustrates two series-circuits 3, 4, 5; 3', 4', 5', there additionally being rectifiers 8, 8', for decoupling the individual series-circuits. Each series-circuit has connected to it two controllable rectifiers 6, 7; 6', 7', operating in the manner described above. Thus, the capacitors of two or more of the series-circuits are charged up via the inductance 2 and have their charges changed via the respective inductances 4, 4', as explained above.

By connecting two or more series-circuits, via the inductance 2, to the voltage source 1, a current can flow through this inductance and a voltage can be taken off across it, even while any one of the series-circuit is "waiting" until its particular rectifier has recovered and is able to undergo the next cycle of operation. Consequently, there can be obtained across the inductance 2 a voltage whose wave shape is that of directly consecutive cosinusoidal half waves. These cosinusoidal half waves have a large harmonic content, which can be filtered out, so that there can, in a very simple manner, be obtained frequencies which have not heretofore been obtainable in inverters incorporating controllable rectifiers.

Inasmuch as not only the inductance 2 in the charging circuit of the present invention according to FIGURE 3, but also the inductance 4, 4' of each of the parallelly connected series-circuits can be used as a load or otherwise used as an output, it becomes possible to operate simultaneously at different frequencies. The voltage across the charging capacitor 2 has a frequency which is formed by the sum of the frequencies of the charge-change inductances of the individual series-circuits. Thus, a circuit such as is shown in FIGURE 3 can be used as an inductive heater, in which the charging inductance produces the main heating in a main zone, while the series-circuit inductances 4, 4', can be used for producing the heating in a preliminary or supplemental heating zone.

It is also possible to let the inductances constitute different loads; alternatively, different loads, as, for example, supersonic generators, transformers or induction heaters, can be coupled to the individual inductances.

It will be understood that the above description of the present invention is susceptible to various modifications, changes and adaptations, and the same are intended to be comprehended within the meaning and range of equivalents of the appended claims.

What is claimed is:
1. An inverter, comprising, in combination:
 (a) a charging inductance;
 (b) a series-circuit comprising first and second capacitors and a charge-change inductance connected between said first and second capacitors, said charging inductance and said series-circuit being connected in series across a source of direct current;
 (c) a first controllable rectifier connected across so much of said series-circuit which includes said first capacitor and said charge-change inductance; and
 (d) a second controllable rectifier connected across so much of said series-circuit which includes said second capacitor and said charge-change inductance.

2. An inverter as defined in claim 1 wherein at least one of said inductances serves as a load.

3. An inverter as defined in claim 1, further comprising load means coupled to at least one of said inductances.

4. An inverter as defined in claim 1 wherein said charging inductance is constituted by the primary winding of a transformer, said transformer having a secondary winding, said secondary winding being connected in series with a further rectifier, the series-circuit constituted by said secondary winding and said further rectifier being connected across said source of direct current, in consequence of which the voltage across said windings is limited in a direction determined by the polarity of said further rectifier.

5. An inverter as defined in claim 1 wherein said charge-change inductance is constituted by the primary winding of a transformer, said transformer having a secondary winding, said secondary winding being connected in series with a further rectifier, the series-circuit constituted by said secondary winding and said further rectifier being connected across said source of direct current, in consequence of which the voltage across said windings is limited in a direction determined by the polarity of said further rectifier.

6. An inverter as defined in claim 1 wherein said charging inductance is constituted by the primary winding of a first transformer, said first transformer having a secondary winding, the same being connected in series with a third rectifier, the series-circuit constituted by asid secondary winding and said third rectifier being across saia source of direct current, in consequence of which the voltage across said windings of said first transformer is limited in a direction determined by the polarity of said third rectifier; and wherein said charge-change inductance is constituted by the primary winding of a second transformer, said second transformer having a secondary winding, the same being connected in series with a fourth rectifier, the series-circuit constituted by said last-mentioned secondary winding and said fourth rectifier being connected across said source of direct current, in consequence of which the voltage across said windings of said second transformer is limited in a direction determined by the polarity of said fourth rectifier.

7. An inverter as defined in claim 6, further comprising means responsive to the flow of current through said third and fourth rectifiers for controlling said first and second rectifiers.

8. An inverter as defined in claim 1, further comprising at least one further series-circuit as set forth in (b) and connected in parallel with the first-mentioned series-circuit (b), said further series-circuit having connected to it two further controllable rectifiers as set forth in (c) and (d) respectively.

9. An inverter as defined in claim 8, further comprising a plurality of additional rectifiers corresponding in number to the number of series-circuits as defined in (b), each additional rectifier being connected between said charging inductance and a respective one of said series-circuits (b).

No references cited.

JOHN F. COUGH, *Primary Examiner.*

W. M. SHOOP, *Assistant Examiner.*